Oct. 27, 1942.   R. H. ZINKIL ET AL   2,300,030
VALVE
Filed June 10, 1940
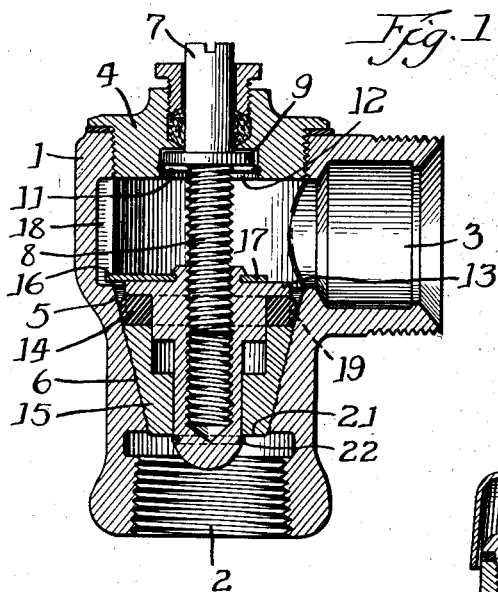
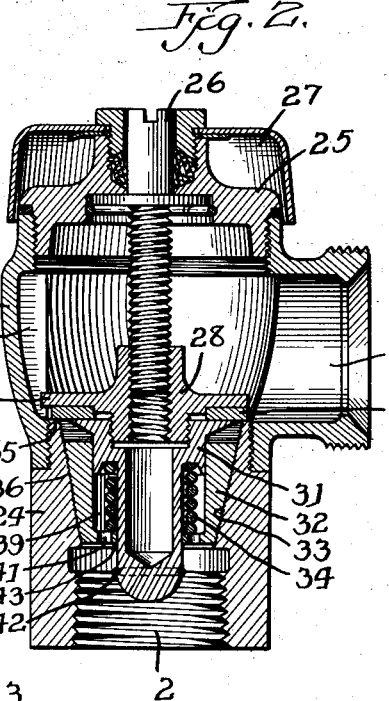
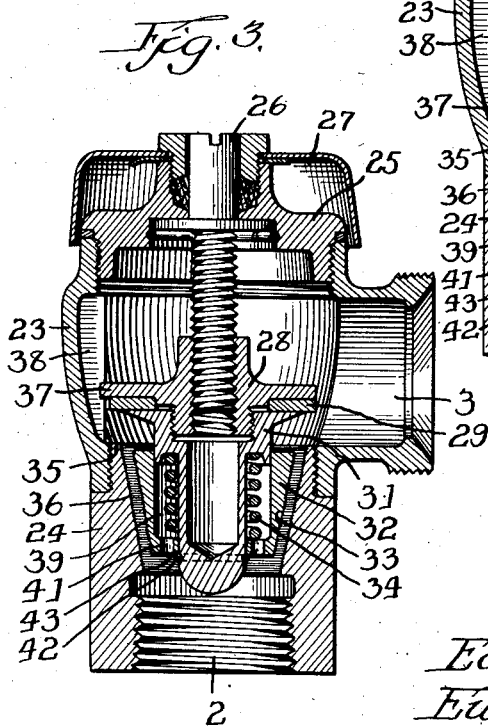
Inventors:
Roy H. Zinkil,
Edward A. Fredrickson, &
Eugene W. Marchand Jr.
By Joseph O. Lange Atty.

Patented Oct. 27, 1942

2,300,030

UNITED STATES PATENT OFFICE

2,300,030
VALVE

Roy H. Zinkil, Oak Park, Edward A. Fredrickson, Chicago, and Eugene W. Marchand, Jr., Maywood, Ill., assignors to Crane Co., Chicago, Ill., a corporation of Illinois Application June 10, 1940, Serial No. 339,640

3 Claims. (Cl. 137—111)

This invention relates to a valve and more particularly to a relatively quiet control stop valve in which a positive stop or closure member is utilized in combination with a resilient throttling member and in which the manufacture thereof is relatively simplified so as to avoid the usual need for close tolerances in devices of this type.

An important object of our invention is to provide a valve for use preferably, though not necessarily, on a domestic water pipeline which will serve the dual purpose of completely shutting off the flow of fluid through the pipeline and of silencing the noises inherent in such pipelines when fluid flows therethrough at relatively high velocities in addition to being self-cleaning during the course of operation.

A still further object is to provide a resiliently mounted throttling and silencing member which is positively operable in cooperation with the closure member and which produces its throttling and silencing effect by the character of the surface presented to the flow of fluid therepast.

It is recognized that, in general, alleged resilient throttling and silencing members have been previously known and used as evidenced by the United States Patent to Erickson, #1,833,518, for example, but to our knowledge no one has previously devised a compact and economical resilient silencing and throttling member which cooperates directly with the closure member and is in substantial axial alignment therewith to provide a conveniently operable device.

Further objects and advantages of the invention will appear as the following specific descriptions of the various embodiments are read in connection with the accompanying drawing, in which Fig. 1 is a vertical sectional view of a valve showing a preferred embodiment of our invention having a silencing member mounted upon a resilient closure member.

Fig. 2 is a vertical sectional view of a modified valve construction showing the silencing member of Fig. 1 resiliently mounted upon the closure member and further showing the closure member in the closed position.

Fig. 3 is a view similar to Fig. 2 but showing the closure member in the open position.

Similar reference characters refer to similar parts throughout the various views of the drawing.

Referring to Fig. 1, the valve body or casing 1 is provided with the usual threaded inlet 2 and the threaded outlet 3 and also has its upper portion internally screw threaded to receive the bonnet 4. The casing 1 is provided with a frusto- conical seat 5, the lower portion 6 of which is roughened, serrated or otherwise rendered unsmooth for purposes hereinafter explained in greater detail. The stem 7, having its lower portion 8 threaded and having an enlarged central portion 9, is rotatably secured to the bonnet 4 by the snap ring 11 maintaining the enlarged portion 9 within the recess 12, although other means may be used. The valve closure member comprising the nut 13, the deformable sealing member 14 and the throttling and silencing member 15, the last mentioned member having its conical surface roughened or serrated, is screw threadedly mounted upon the end 8 of the stem and is restricted to reciprocable motion upon rotational movement of the stem by reason of the end 16 of the lock plate 17 projecting into the groove 18.

The operation of the valve is accomplished by the conventional rotational movement of the stem in the opening direction and the upward movement of the nut 13 whereupon the compression upon the deformable sealing material 14 is relieved, allowing the said sealing medium to assume its normal shape, as indicated by the dash lines 19, and permitting limited flow of fluid between the unsmooth or serrated surfaces of the seat 6 and the member 15. It will be noted that the member 15, which is slidably engaged with the nut 13, will resiliently resist fluid flow through the valve, inasmuch as the fluid pressure acting upon the lower surface 21 of the member 15 exerts an upwardly directed force which is transmitted to the resilient member 14 which in turn resists the upward movement of the member 15. Increased flow through the valve may be obtained by further rotational movement of the stem in the opening direction whereupon the ring 22 engages the surface 21 and positively raises the member 15 from its position in close proximity to the surface 6.

The valve represented in the closed and open positions, respectively, by Figs. 2 and 3 is also of a non-rising stem type and its operation is similar to that of the valve shown in Fig. 1. Reference being had specifically to Fig. 2, the valve comprises a two-part casing, the members 23 and 24, a bonnet 25 screw-threadedly attached to the upper portion of the member 23, and a stem 26 rotatably retained within the said bonnet. The said stem is provided with a handwheel 27 which is secured to its upper exposed end and a closure member screw-threadedly engaged with the lower end. The closure member comprises a nut 28 which is in direct screw-threaded engagement respectively with the stem 26, a disc or closure member 29, a retaining member 31, a hollow throttling and silencing member 32 slidably surrounding the retaining member and preferably having a roughened or unsmooth conical surface 33, and a coil spring member 34 interposed between the retaining member and the said throttling member. The tubular member 24, which provides the inlet 2, has a seat 35 at its upper end and a tapered unsmooth surface 36 immediately below the seat. The nut 28 is provided with a lateraly projecting extension 37 which projects into the groove 38 to prevent the rotational movement of the said nut upon the manual operation of the handwheel 27.

Upon initial operation of the handwheel in the opening direction, the disc 29 is raised from the seat 35. However, any substantial flow of fluid through the valve is not permitted because the spring 34, aided by fluid entering the spring chamber 39 through the ports 41, maintains the throttling member 32 in contact with the surface 36. As more clearly shown in Fig. 3, upon further operation of the handwheel in the opening direction, the compression within the spring 34 is gradually reduced, and in the event that the fluid pressure is not sufficient to lift the member 32, the ring 42 will thereupon engage the lower surface 43 of the said member and positively lift the silencing member 32 from the surface 36 thereby allowing limited or unrestricted flow through the valve. It will be noted that when the valve is in the open position, the spring 34 resiliently retains the member 32 in a position to resist the fluid flow through the valve.

Attention is directed to the fact that valves presently available have the undesirable tendency to be cut and worn away at the seating surfaces of the closure member by reason of fluid flowing therepast at high velocities when the valve is in the throttled position. Our invention substantially eliminates any cutting or wearing action at the seating surfaces because as the closure member approaches its seat the throttling and silencing member increasingly restricts the flow through the valve. Also, inasmuch as the silencing and throttling member has a relatively large opening or openings, the fluid passing therethrough has a comparatively low velocity and the tendency to cut and to erode the surfaces is substantially eliminated.

While we have shown and described various preferred embodiments of our invention, it is obvious to those skilled in the art that further modifications may readily be made. Therefore, we wish to be limited only by the scope of the appended claims.

We claim:

1. A quiet-flow valve comprising a casing having an inlet and an outlet, the casing having a frusto-conical seat between the said inlet and outlet, the said seat being provided with a roughened surface, closure means for the said inlet comprising respectively an axially movable closure member and a resiliently mounted throttling member, the latter member being supported by the said closure member and normally maintained in spaced-apart relation therefrom by a resilient annular element substantially contained within the said throttling member, the said latter member having a roughened surface adapted to cooperate with the roughened surface of the said seat whereby an annular space is permitted between the said seat and the said throttling member to accurately define the fluid flow within the said valve in response to line flow fluctuations, the said throttling member being snugly mounted telescopically upon a lower portion of the said closure member to provide a housing for the said resilient annular element.

2. In a combined silencing and throttling device, comprising a casing having an inlet and an outlet, the said inlet having respective frusto conical throat and substantially horizontal seat portions, the said frusto conical throat portion having a roughened surface, combined silencing and throttling means within the throat portion of the said inlet cooperating with the said throat portion comprising respectively a closure member to engage the substantially horizontal seat portion and a resiliently mounted elongated, frusto-conical throttling member having a roughened tapered periphery for engagement with the said frusto-conical throat portion of the casing, the said closure member having means comprising a resilient member for effecting engagement of the said throttling member with the said throat and serving to maintain the said latter member in spaced-apart relation to the closure member with a substantially unbroken periphery therebetween, the said throttling member being mounted to permit axial movement thereof relative to the said closure member and adapted to engage the roughened surface portion of the said throat upon predetermined reciprocable movement of the said closure member, whereby upon closing the valve the said throttling member is compressed against the said throat to provide fluid tightness, a portion of the said closure member moving simultaneously telescopically within the said throttling member to compress the said resilient member so as to render substantial seat tightness when the said throttling member contacts the said throat surface portion, the said resilient member being substantially contained within peripheral limits provided by assembly of the said throttling member with the said closure member.

3. A valve comprising a casing having an inlet and an outlet, the said casing having a compound seat at the said inlet, the said seat comprising an upper flattened portion and a subjacent frusto-conical lower portion tapering inwardly, the said lower portion having a roughened surface, a plurality of closure means for the said seat portions comprising a positive closure member for the upper flattened portion, a resiliently mounted throttling member having an elongated, roughened frusto-conical surface portion for engagement with the frusto-conical seat portion below the said closure member, the said closure member and the said throttling member being arranged in resilient telescopic assembly to allow for limited longitudinal movement of the said closure member relative to the throttling member either upon opening or closing of the said valve, whereby the annular orifice produced by the roughened throttling member in cooperation with the said roughened frusto-conical surface portion is permitted substantial variation without affecting the position of the said closure member, the means providing for the said resilient telescopic assembly being annularly mounted within a chambered space formed jointly between the said closure and throttling members.

ROY H. ZINKIL.
EDWARD A. FREDRICKSON.
EUGENE W. MARCHAND, Jr.